United States Patent
Tanaka

(10) Patent No.: US 6,903,905 B2
(45) Date of Patent: Jun. 7, 2005

(54) MAGNETIC HEAD INCLUDING MAGNETORESISTIVE ELEMENT FOR PERPENDICULAR MAGNETIC RECORDING TYPE DISK DRIVE

(75) Inventor: Yoichiro Tanaka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 383 days.

(21) Appl. No.: 10/025,960

(22) Filed: Dec. 26, 2001

(65) Prior Publication Data
US 2002/0089796 A1 Jul. 11, 2002

(30) Foreign Application Priority Data
Dec. 26, 2000 (JP) .................................... 2000-396017

(51) Int. Cl.[7] ................................................ G11B 5/00
(52) U.S. Cl. .................................. 360/324.12; 360/135
(58) Field of Search .............................. 360/324, 324.1, 360/324.12, 135

(56) References Cited

U.S. PATENT DOCUMENTS

| 5,815,342 | A | | 9/1998 | Akiyama et al. |
| 5,933,297 | A | | 8/1999 | Hoshiya et al. |
| 6,125,019 | A | | 9/2000 | Hoshiya et al. |
| 6,256,177 | B1 | * | 7/2001 | Urai et al. ............. 360/324.12 |
| 6,667,848 | B1 | * | 12/2003 | Khizroev et al. ........... 360/125 |

FOREIGN PATENT DOCUMENTS

| JP | P2000-67415 | 3/2000 |
| JP | P2000-156317 | 6/2000 |

* cited by examiner

Primary Examiner—Brian E. Miller
(74) Attorney, Agent, or Firm—Pillsbury Winthrop, LLP

(57) ABSTRACT

This invention provides a perpendicular magnetic recording type disk drive comprised of a double-layered disk medium and a magnetic head containing a read head element containing a GMR element. The GMR element has a linear response dynamic range characteristic larger than an average value of a reproduction magnetic field from a disk 101 and a characteristic capable of avoiding or suppressing saturation phenomenon even if it is affected by a strong reproduction magnetic field from the disk medium.

7 Claims, 6 Drawing Sheets

US 6,903,905 B2

MAGNETIC HEAD INCLUDING MAGNETORESISTIVE ELEMENT FOR PERPENDICULAR MAGNETIC RECORDING TYPE DISK DRIVE

CROSS-REFERENCE TO RELATED APPLICATIONS

This application is based upon and claims the benefit of priority from the prior Japanese Patent Application No. 2000-396017, filed Dec. 26, 2000, the entire contents of which are incorporated herein by reference.

BACKGROUND OF THE INVENTION

1. Field of the Invention

The present invention relates to generally a perpendicular magnetic recording type disk drive and more particularly to a disk drive composed of a double-layered perpendicular magnetic recording type disk medium and a read head including an MR element.

2. Description of the Related Art

In recent years, public attention has been paid to a perpendicular magnetic recording as a technology for surpassing the limit of recording density of conventional longitudinal magnetic recording in the field of a disk drive represented by the hard disk drive. In this field of the perpendicular magnetic recording system, a disk drive which employs a double-layered disk medium (hereinafter referred to as disk) as its recording medium has been developed for practical application.

The double-layered disk has a recording magnetic layer possessing perpendicular magnetic anisotropy and a soft magnetic layer provided between the recording magnetic layer and a substrate. At the time of data recording operation, the soft magnetic layer has a function for supporting the head recording action by passing part of magnetic flux generated from a magnetic pole of the head to the other magnetic pole. In the double-layered disk, when the magnetic head is executing its read operation, magnetization of the soft magnetic layer, which is a bottom portion of the recording magnetic layer and the read head element are magnetically coupled with each other and operated. As a result, principally, a larger read magnetic field is generated than in case where there is no soft magnetic layer.

Today, the perpendicular magnetic recording type disk drive, which employs such a double-layered disk based on the perpendicular magnetic recording system and a magnetic head having a read head element composed of a giant magnetoresistive (GMR) element, has been developed for its practical purpose (see, for example, U.S. Pat. No. 5,933,297 and U.S. Pat. No. 6,125,019). Meanwhile, in an ordinary longitudinal magnetic recording type disk drive, a magnetic head in which the read head element and an inductive write head element are mounted on a slider thereof is used as a read/write head.

The conventional GMR element has been developed so as to be adapted to the longitudinal magnetic recording type disk whose recording magnetic layer is relatively thin. When a recording signal recorded magnetically in a perpendicular direction to a disk surface is reproduced by means of this conventional GMR element, there may occur such a problem that saturation phenomenon of the GMR element occurs so that a read signal waveform from the read head element is distorted. This phenomenon is estimated to be generated because a GMR element action point is shifted due to leaking magnetic field from a uniformly magnetized region except a transition to recording magnetization in the recording magnetic layer on the disk, so that response dynamic range of the read head element is narrowed correspondingly.

Because according to the longitudinal magnetic recording method, magnetic field applied from such uniformly magnetized region to the GMR element is substantially zero, such a problem has been never generated. That is, this problem is particular to a case where the disk having perpendicular magnetic anisotropy and the GMR element (including the MR element) acting as a read head element are combined.

As described above, in the double-layered disk, when the magnetic head executes a read operation, a larger read magnetic field occurs than in case where there is no soft magnetic layer, because of the magnetization state of that soft magnetic layer which is a bottom portion of the recording magnetic layer. As a result, an allowance to the saturation of the GMR element is small. Under this condition, leaking magnetic field (uniform magnetic field) from an adjacent track recorded in a single direction is added to a reading object track on a disk, thereby possibly causing the saturation of the GMR element.

BRIEF SUMMARY OF THE INVENTION

The object of the present invention is preventing and suppressing of the saturation of the GMR element, providing perpendicular magnetic recording type disk drive which is outputted from the read head element and can be a high-quality of the read signal.

In accordance with one aspect of the present invention, there is provided a perpendicular magnetic recording type disk.

The disk drive comprising:

a double-layered perpendicular magnetic type disk medium having a recording magnetic layer of perpendicular magnetic anisotropy and a soft magnetic layer; and a magnetic head containing a read head element for reading data from the disk medium, the read head element using a giant magnetoresistive (GMR) element, and when outputting a read signal waveform corresponding to a reproduction magnetic field from the disk medium, outputting the read signal waveform in which waveform distortion due to leaking magnetic field from the disk medium is suppressed.

the read head element has a reproduction characteristic of linear response dynamic range larger than an average value of reproduction magnetic field from the disk medium.

DETAILED DESCRIPTION OF THE INVENTION

Hereinafter, the embodiments of the present invention will be described in detail with reference to the accompanying drawings.

(Structure of the Disk Drive)

Figure 10:
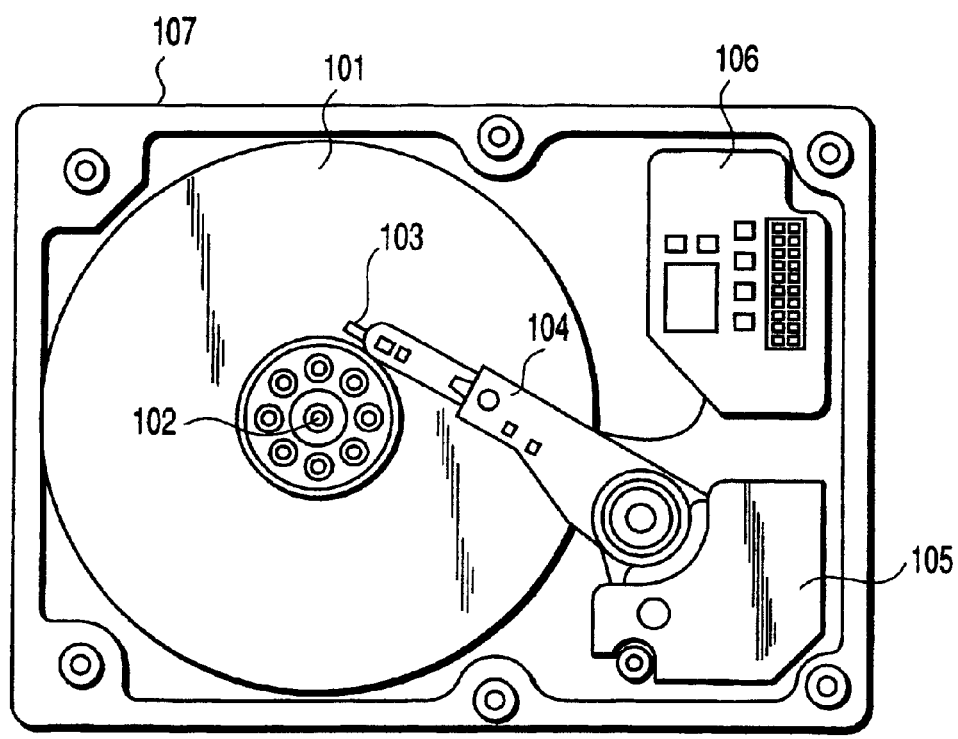
FIG. 10 is a diagram showing major portions of the disk drive according to the same embodiment.

FIG. 10 shows major portions of the disk drive of the perpendicular magnetic recording type according to the same embodiment. This disk drive includes a drive mechanism comprised of a disk 101, a spindle motor (SPM) 102 and an actuator inside a case (whose upper cover is omitted in the Figure) which is a drive main body.

The actuator comprises an arm 104 including a suspension loaded with a magnetic head 103 and a voice coil motor (VCM) 105 which moves the same arm 104 in a radius direction on the disk 101. The actuator moves the head 103 in the radius direction on the head 103 at the time of data read/write operation. The actuator carries out unloading operation for retracting the head 103 from on the disk to a ramp member (not shown) disposed outside the disk 101 at the time of read/write operation stop.

A circuit board 106 containing a pre-amplifying circuit or the like is disposed in the case 107. The pre-amplifying circuit is connected to the head 103 through a flexible print cable (FPC) so as to transmit read/write signals.

The head 103 is a magnetic head containing a read head element made of the GMR element, which will be described later, and an inductive type write head element, those elements being mounted on a slider. The disk 101 is a double-layered perpendicular magnetic type recording medium comprised of a recording magnetic layer having perpendicular magnetic anisotropy and soft magnetic layer disposed between the same recording magnetic layer and its disk substrate.

(Structure of the Head and Disk)

Hereinafter, the structure of the magnetic head 103 and the disk 101 according to the same embodiment will be described with reference to FIG. 1.

Figure 1:
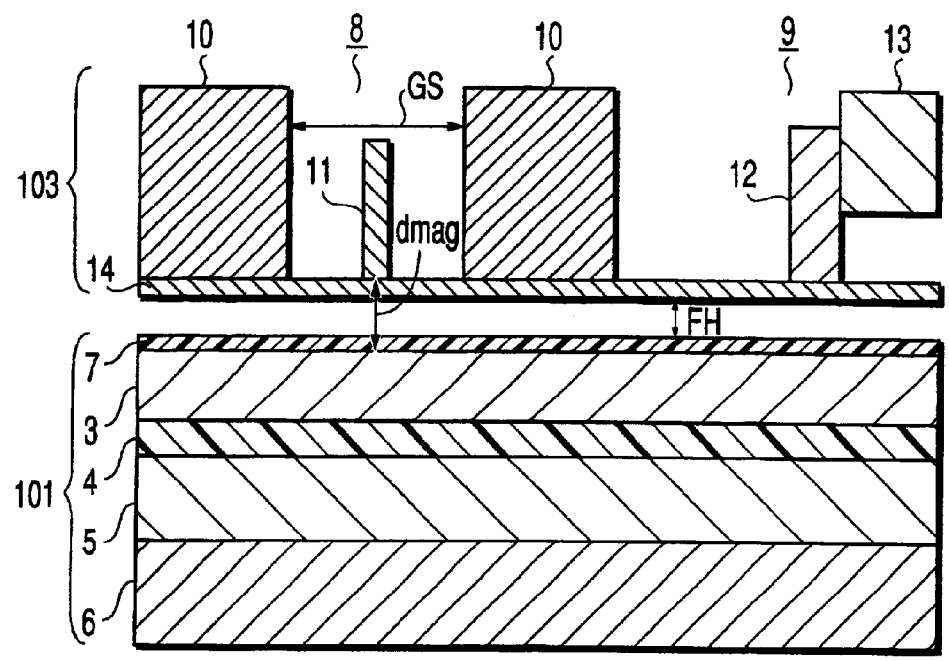
FIG. 1 is a diagram for explaining the structure of a GMR element and a disk according to an embodiment of the present invention.

The head 103 is composed of a read head element 8 composed of a GMR element formed on a substrate (AlOTiC substrate) (not shown) and an inductive type write head element 9, as shown in FIG. 1. The read head element 8 is so constructed that the GMR element is disposed between a pair of magnetic shields 10. The GMR element 11 uses, for example, an artificial exchange coupling type spin-valve element and possesses a film structure of PtMn/ CoFe/Ru/NiFe/ CoFe/Cu/CoFe/NiFe/Ta. A shield gap Gs is, for example, 100 nm. The height H in the vertical direction of the GMR element 11 is, for example, 300 nm.

The write head element 9 has a perpendicular single-pole type recording magnetic pole 12 which opposes the disk 101. The write head element 9 has a yoke 13 disposed behind the magnetic pole 12 while magnetically connected thereto. The write head element 9 is excited by a recording coil (not shown) through this yoke 13 so as to generate a strong perpendicular recording magnetic field to the write head element 9.

The magnetic head 103 has the read head element 8 and the write head element 9 mounted on the slider which is a head main body. The slider has an air bearing surface (ABS) which raises it over the disk 101. This ABS has a protective film 14 for protecting the surface of for example, 3 nm in thickness. This protective film 14 is composed of diamond like carbon (DLC) protective film formed according to for example, cathodic arc method or chemical vapor deposition (CVD) method.

The ABS has a pattern for generating air pressure accompanying a rotation of the disk 101. The slider is raised over the disk 101 by air pressure, so that flying height FH at an intermediate circumference position (23 mm in radius) of the disk 101 is, for example, about 15 nm in case where the rotation number of the disk 101 is for example, 4200 rpm. Due to this relation, as shown in FIG. 1, a distance from the surface of the recording magnetic layer 3 of the disk 101 and the surface on the side of the disk of the GMR element 11, that is, magnetic spacing dmag is total (for example, 21 nm) of the flying height FH (for example, 15 nm), thickness of the protective film 14 (for example, 3 nm) and thickness of the protective film 7 of the disk 101 (for example, 3 nm).

On the other hand, in the disk 101, a soft magnetic layer 5, a crystal control layer 4 and a recording magnetic layer 3 are layered on a substrate 6 having a diameter of 64 mm (about 2.5 inch) made of aluminum silicate base glass or crystal glass. The soft magnetic layer 5 is formed according to, for example, sputtering formation method. The recording magnetic layer 3 is formed on the soft magnetic layer 5 via the crystal control layer 4 and has excellent perpendicular magnetic anisotropy. The recording magnetic layer 3 is a magnetic film in which C-axis of HCP crystalline structure made of, for example, Co, Cr, Pt, Ta or Co, Pt, Cr, O is oriented in the perpendicular direction with respect to film surface thereby producing a high perpendicular magnetic anisotropy. If CoPtCrO film is used, Pt density is 20 at % and Cr density is 12 at % and a fine structure in which oxygen is segregated in its crystalline interface region is possessed.

As compared to a conventional longitudinal magnetic recording method, the disk 101 of the perpendicular magnetic recording type of the same embodiment can achieve a high recording resolution with a larger film thickness and has an excellent thermal fluctuation resistance because its magnetic particle volume increases accompanied thereby. According to this embodiment, the film thickness of the recording magnetic layer 3 of perpendicular anisotropy made of CoPtCrO is set to, for example, 25 nm. The crystal control layer 4 is made of, for example, Ru material and its film thickness is set to for example, about 5 nm. The soft magnetic layer 5 is composed of layered [CoFeTaC/C] and the quantity n of the layers is 10 and the thickness of the entire layer 5 is 90 nm. The protective film 7 is formed of diamond like carbon (DLC) according to, for example, cathodic arc method on the recording magnetic layer 3. The thickness of the protective film 7 is, for example, 3 nm. Here, saturation magnetization Ms of the recording magnetic layer 3 is for example, 250 emu/cc (3.95T). Remnant magnetization Mr of the recording magnetic layer 3 is, for example, 245 emu/cc (3.87T). That is, rectangular ratio (Mr/Ms) is, for example, 0.98.

(Characteristic of the GMR Element)

Figure 2:
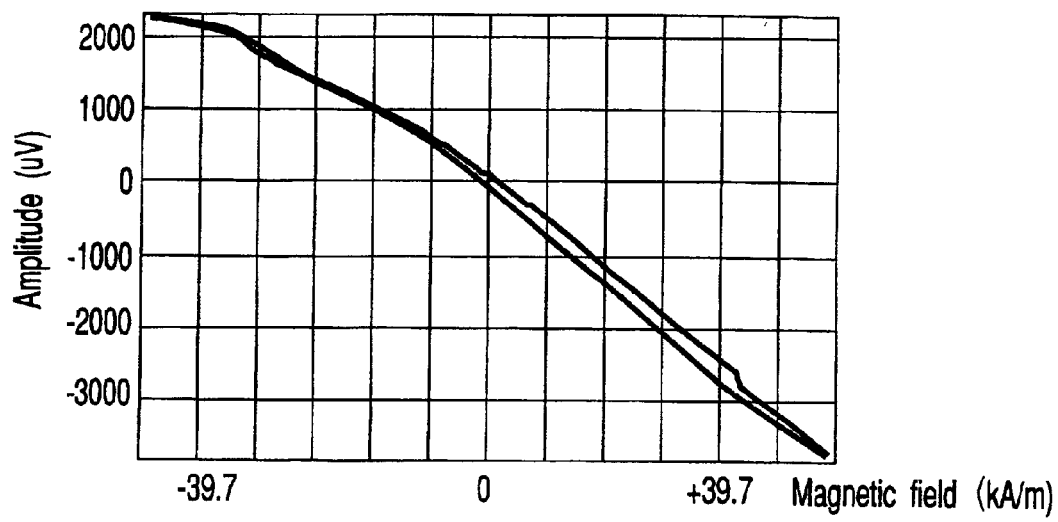
FIG. 2 is a diagram showing the magnetic field response characteristic of the GMR element of the same embodiment.

FIG. 2 is a characteristic diagram showing magnetic field response characteristic of the GMR element 11 of this embodiment. That is, in the GMR element 11 of this embodiment, its longitudinal bias magnetic field is set large, so that its linear operating range, that is, a range in which the linearity is secured is set to, for example, ±39.7 kgA/m. Thus, the GMR element 11 of this embodiment is so set up not to be saturated even if a strong reproduction magnetic field is applied from the disk 101. In this case, the saturation magnetic field Hs in the magnetic field response characteristic of the GMR element 11 is, for example, 39.7 kA/m. More specifically, in a condition in which a product of magnetization and film thickness of CeFe/NiFe free layer of the spin-valve GMR element is Mst and a product of remnant magnetization and film thickness of CoPt base hard magnetic film (not shown) provided at an end portion of the slider for perpendicular bias is Mrt, a ratio Mrt/Mst is set to 3 or more, preferably 4.0. The reproduction average magnetic field within the GMR element 11 is so set up that even if a magnetic field flows in from the disk 101 of 39.7 kA/m, the reproduction response characteristic of the GMR element 11 is not saturated.

Figure 3:
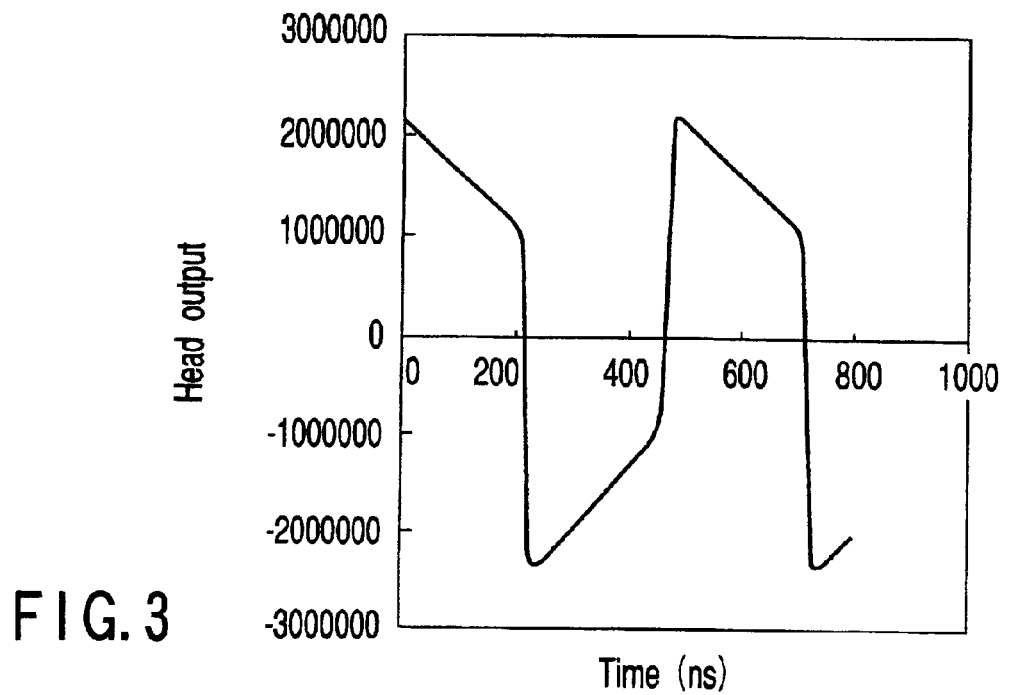
FIG. 3 is a diagram showing the output signal waveform of the GMR element of the same embodiment.

FIG. 3 is a diagram showing the output waveform (read signal waveform) of the GMR element 11 of the same embodiment. That output waveform is recognized to be a waveform in which saturation phenomenon is never seen as evident from comparison with the output waveform (see FIG. 9) in which the saturation phenomenon, which will be described later, arises. Meanwhile, the ordinate axis of FIG. 3 indicates a head output (read signal amplitude value) of the read head element composed of the GMR element 11, which is an arbitrary unit.

Figure 4:
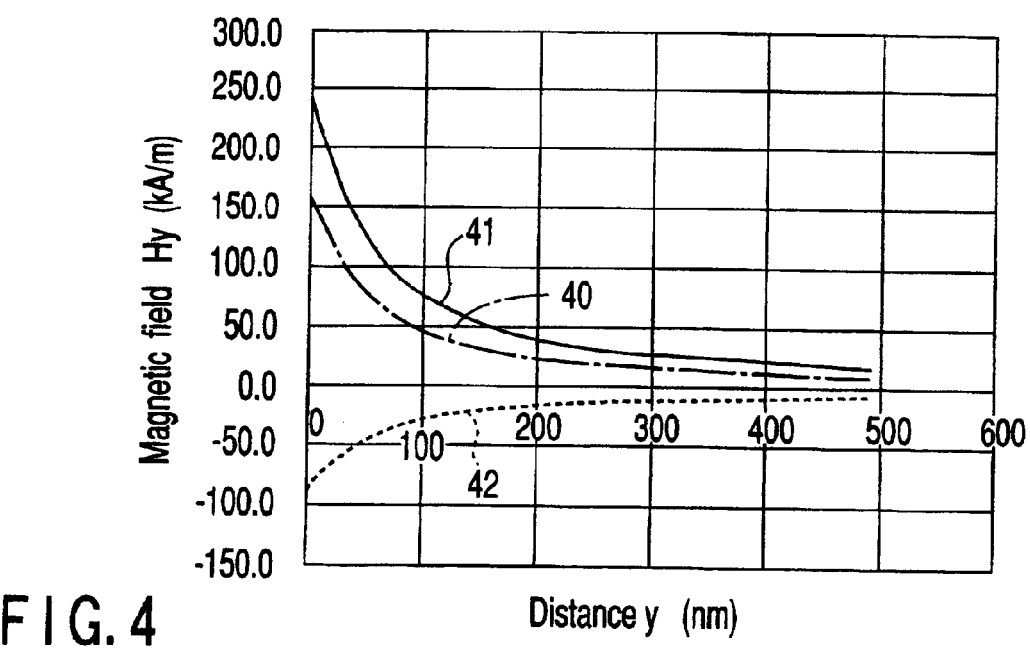
FIG. 4 is a diagram showing a result of simulation of magnetic field distribution in a vertical direction, which the GMR element receives from a disk according to the same embodiment.

FIG. 4 shows a result of simulation of perpendicular magnetic field distribution which the GMR element 11 of the same embodiment receives from the disk 101. In the same Figure, the ordinate axis indicates internal magnetic field (Hy) inside the GMR element 11 and the abscissa axis indicates the position of the GMR element 11, representing a distance (y) from the surface of the disk 101. The position of the GMR element 11 is a distance y in the range of, for example, 21 nm to 321 nm.

That is, in this simulation, the GMR element 11 indicates a state in which the recording magnetic layer 3 of the disk 101 is magnetized uniformly in a single direction or distributions (41, 40, 42) of perpendicular magnetic fields with respect to leaking magnetic fields (Hys, Hy, Hyb) from a gap of a pair of the magnetic shields 10 when remnant magnetization state of "Mr=3.87T" arises. Hys indicates contribution from magnetization of the surface of the recording magnetic layer 3 and Hby indicates contribution from the rear surface of the recording magnetic layer 3. A sum Hy of the Hys and Hyb is applied to the GMR element 11.

Figure 5:
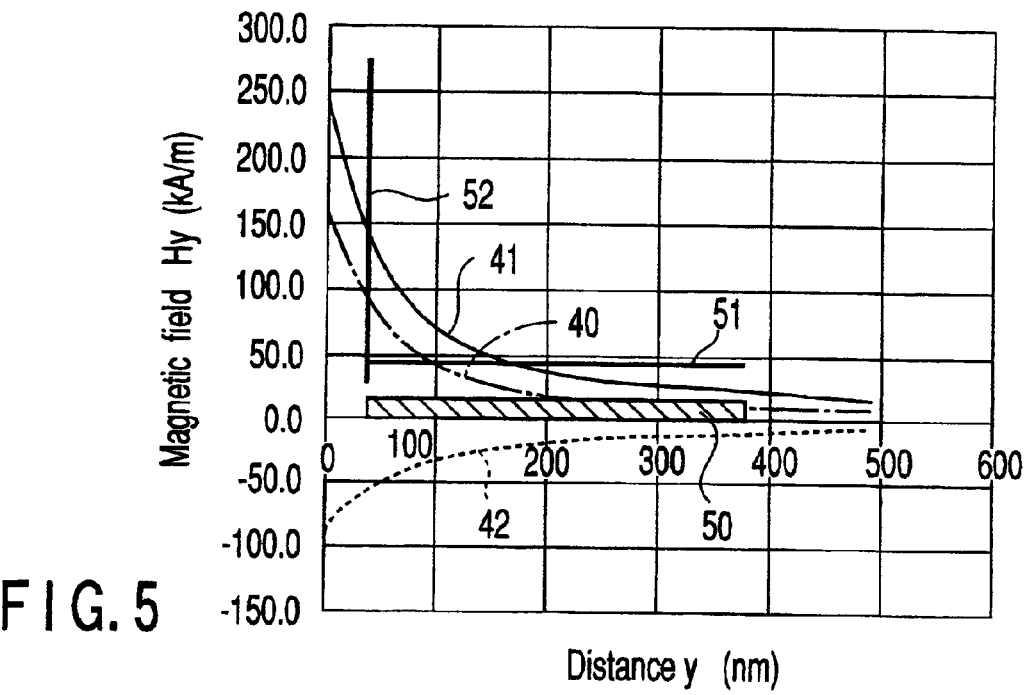
FIG. 5 is a diagram showing the relation among the position of the GMR element, average magnetic field inside the GMR element and maximum field intensity in FIG. 4.
Figure 6:
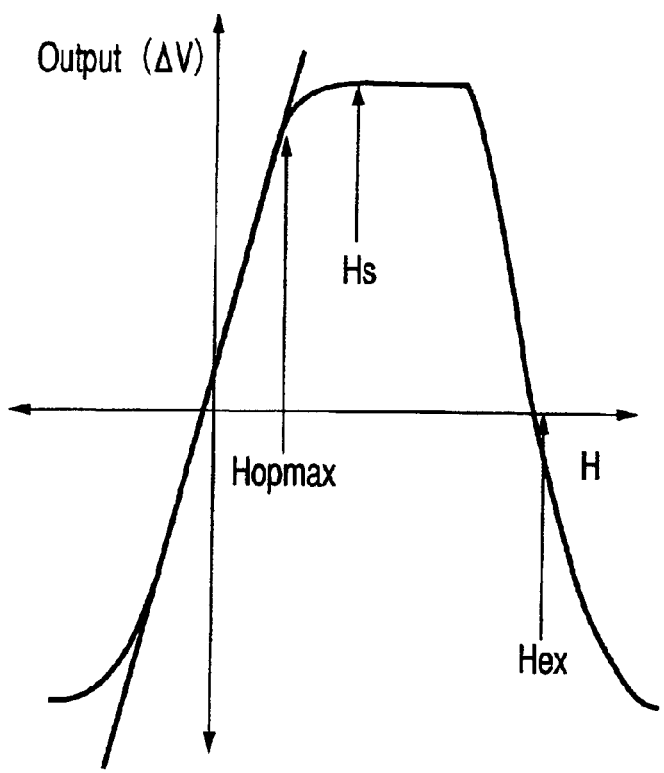
FIG. 6 is a diagram showing an average magnetic field response characteristic to the output in the GMR element according to the same embodiment.

FIG. 5 is a diagram showing the relation among the position 50 of the GMR element 11, reproduction average magnetic field 51 inside the GMR element 11 and maximum magnetic field intensity 52 in the simulation result of FIG. 4. FIG. 5 indicates that the reproduction average magnetic field 51 (Hmu) within the GMR element 11 is 36.1 (kA/m) max. and that the GMR element 11 receives a magnetic field twice or three times stronger than the leaking magnetic field (magnetic field from the disk) which the GMR element of the conventional longitudinal magnetic recording type). The magnetic field distribution within the GMR element 11 is settled in a range of ±39.7 (kA/m) in which the linearity of the magnetic field response characteristic of the aforementioned GMR element 11 is secured. In this case, a relational expression "reproduction average magnetic field Hmu<saturation magnetic field Hs" is established. Here, the maximum magnetic field intensity (Hopmax) of the linear response range of the GMR element 11 is, for example, 37.3 (kA/m). A relational expression "Hopmax>Hmu" is established between this maximum magnetic field intensity (Hopmax) and reproduction average magnetic field (Hmu). FIG. 6 is a diagram showing average magnetic field response characteristic to the output of the GMR element 11, indicating a relation among the maximum magnetic field intensity (Hopmax), saturation magnetic field Hs and artificial antiferromagnetic coupling field (Hex).

Figure 8:
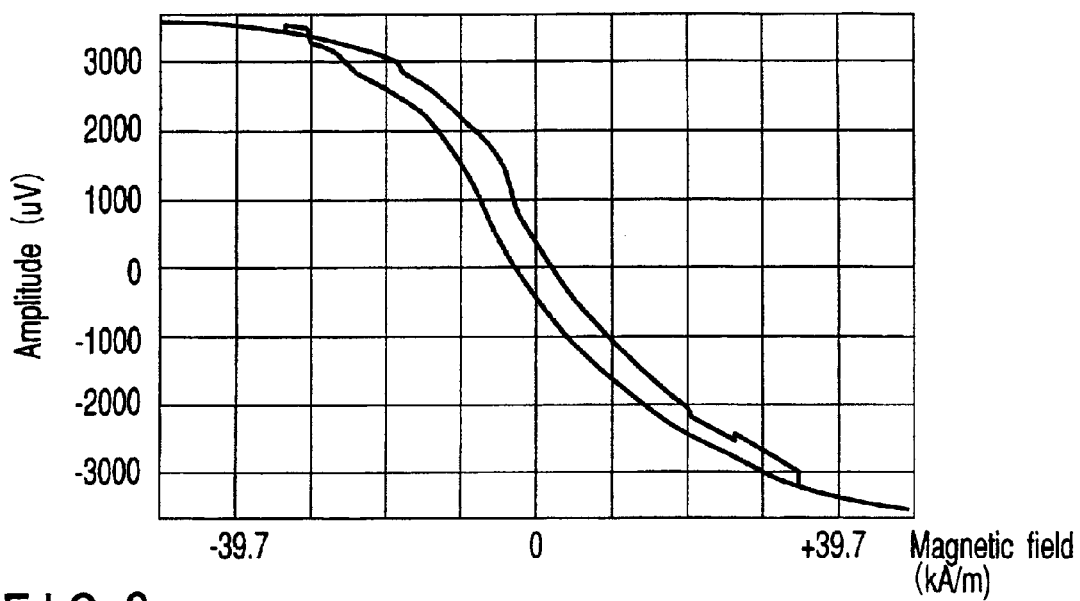
FIG. 8 is a diagram showing the magnetic field response characteristic of the GMR element according to a conventional longitudinal magnetic recording system.
Figure 9:
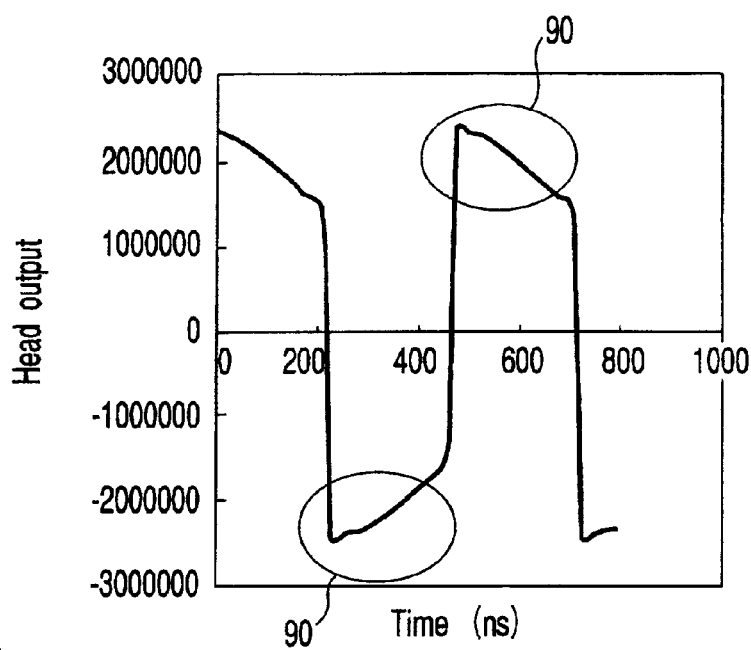
FIG. 9 is a diagram showing the output signal waveform of the GMR element according to the conventional longitudinal magnetic recording method.

FIGS. 8 and 9 are diagrams showing the magnetic field response characteristic and reproduction waveform, respectively, of the reproduction voltage of the GMR element conforming to the conventional longitudinal magnetic recording method. As compared to the GMR element 11 of the same embodiment, as shown in FIG. 8, saturation phenomenon becomes conspicuous around ±31.8 kA/m in the intensity of the leakage magnetic field from the disk. Thus, as shown in FIG. 9, the output waveform of the GMR element becomes a reproduction waveform including an influence (90) of the saturation phenomenon.

In a GMR element conforming to the in-plane magnetic recording method picked up as a comparative example with the GMR element 11 of the same embodiment, the saturation magnetic field Hs in its magnetic field response characteristic is, for example, 15.9 to 23.8 (kA/m). Under this condition, the relational expression "reproduction average magnetic field Hmu>saturation magnetic field Hs" is established, so that the above-described favorable conditional expression "Hmu<Hs" is not satisfied. The maximum magnetic field intensity (Hopmax) is about 15.9 (kA/m) in the positive direction while it is about 4.0 (kA/m) in the negative direction, these values being smaller than the average magnetic field (Hmu). Assuming that the product of magnetization and film thickness of a free layer of the spin-valve GMR element is Mst and a product of remnant magnetization and film thickness of the CoCr base hard magnetic film provided at an end of the slider for longitudinal bias is Mrt, the ratio "Mrt/Mst" is smaller than 3 and about 2.5.

As described above, the GMR element 11 of the same embodiment can avoid or suppress saturation phenomenon even in case of as strong magnetic field intensity as the average magnetic field (Hmu) of the reproduction magnetic field (leakage magnetic field) from the recording magnetic layer 3 of the double-layer perpendicular magnetic disk 101 reaches 36.1 (kA/m). Therefore, if the GMR element 11 of the same embodiment is employed as a read head element in a perpendicular magnetic recording type disk drive using the double-layer disk 101, a high-quality read signal having no distortion due to the saturation phenomenon can be assured. Consequently, it is possible to realize a disk drive in which the perpendicular magnetic recording system effective for intensified recording density and a read head element employing the GMR element conforming to this perpendicular magnetic recording system are combined.

According to this embodiment, the GMR element is employed as the read head element such that the linear response dynamic range of the magnetic field response characteristic is set larger than an average value of the reproduction magnetic field received from the double-layer disk. In this case, the average value of the reproduction magnetic field is an average value of reproduction magnetic field from a track (reading object track) just below the read head element and reproduction magnetic field (leakage magnetic field) from an adjacent track.

(First Modification)

According to this modification, a GMR element employing a specular/artificial exchange coupling type spin-valve element is applied as the GMR element 11. The structure of the read head element 8 using the GMR element 11 is basically the same as the embodiment shown in FIG. 1.

The GMR element 11 of this modification has a film structure of PtMn/CoFe/Ru/NiFe/CoFe/Cu/CoFe/ NiFe/ CeFeO/Ta. Its shield interval, that is, the shield gap length (Gs) is, for example, about 100 nm. The height (H) in the vertical direction of the GMR element is, for example, about 300 nm. The artificial exchange coupling magnetic field (Hex) is, for example, about 158.8 (kA/m).

As described above, the write head 9 has a perpendicular single-pole type recording magnetic pole 12 opposing the disk 101. Further, the write head 9 has a yoke 13 disposed behind the recording magnetic pole 12 such that it is electrically connected to the recording magnetic pole 12. The write head 9 is excited by a recording coil (not shown) through this yoke 13, generating a strong perpendicular recording magnetic field to the disk 101.

The head 103 contains the read head 8 and the write heads 9, these heads being provided on the slider which is a head main body. The slider has an air bearing surface (ABS) which raises it over the disk 101. This ABS has a protective film 14 for protecting the surface of for example, 3 nm in thickness. This protective film 14 is composed of diamond like carbon (DLC) protective film formed according to for example, cathodic arc method or chemical vapor deposition (CVD) method.

The ABS has a pattern for generating air pressure accompanying a rotation of the disk 101. The slider is raised over the disk 101 by air pressure, so that flying height FH at an intermediate circumference position (23 mm in radius) of the disk 101 is, for example, about 15 nm in case where the rotation number of the disk 101 is for example, 4200 rpm. Due to this relation, as shown in FIG. 1, a distance from the surface of the recording magnetic layer 3 of the disk 101 and the surface on the side of the disk of the GMR element 11, that is, magnetic spacing dmag is total (for example, 21 nm) of the flying height FH (for example, 15 nm), thickness of the protective film 14 (for example, 3 nm) and thickness of the protective film 7 of the disk 101 (for example, 3 nm).

The maximum magnetic field intensity (Hopmax), which is a maximum value of magnetic field applied to the GMR element 11 at this time, is, for example, about 118.1 (kA/m) as indicated by Hy(40) in FIG. 5 as a result of the simulation computation. Because the magnetic field Hy from the disk 101 is damped as it invades into the inside of the GMR element 11, the magnetic field Hy from the disk 101 is an average magnetic field (Hmu) at the entire height (H) of the GMR element 11. This average magnetic field (Hmu) is, for example, about 36.1 (kA/m). Further, the artificial antiferromagnetic coupling magnetic field (Hex) of the GMR element 11 is, for example, 158.8 (kA/m), which is larger than a maximum magnetic field (Hmax) of, for example, 118.1 (kA/m) applied locally to a portion the nearest the uniformly magnetized disk 101. Consequently, the artificial exchange coupling of the GMR element 11 is never inverted by a strong magnetic field from the perpendicular magnetic disk, thereby obtaining a stable reproducing action.

Here it is assumed that the artificial antiferromagnetic coupling magnetic field of the GMR element 11 is Hex, the shield gap length is Gs, a distance from an end of the GMR on the head ABS surface up to the surface of the recording magnetic layer 3 is dmag and the remnant magnetization of the recording magnetic layer 3 is Mr. In this case, it is assumed that surface magnetization Mr exists uniformly on the surface of the recording magnetic layer 3 seen from a gap of the shield, that is, an approximately infinite stripe of Gs in width. Then, if a state of the maximum magnetic field of the disk 101 is estimated when the DC is magnetized uniformly including its peripheral tracks, magnetic field intensity (H) applied to a portion of the GMR element 11 nearest the disk 101 can be expressed approximately by a relational expression "H=8Mr*arctan [Gs/(2dmag)]". At this time, the artificial antiferromagnetic coupling magnetic field (Hex) is set larger than the magnetic field intensity (H) (Hex>H). Consequently, the artificial exchange coupling of the GMR element 11 is never inverted even by a strong magnetic field from the disk 101, thereby obtaining a stable reproducing action.

(Second Modification)

Figure 7:
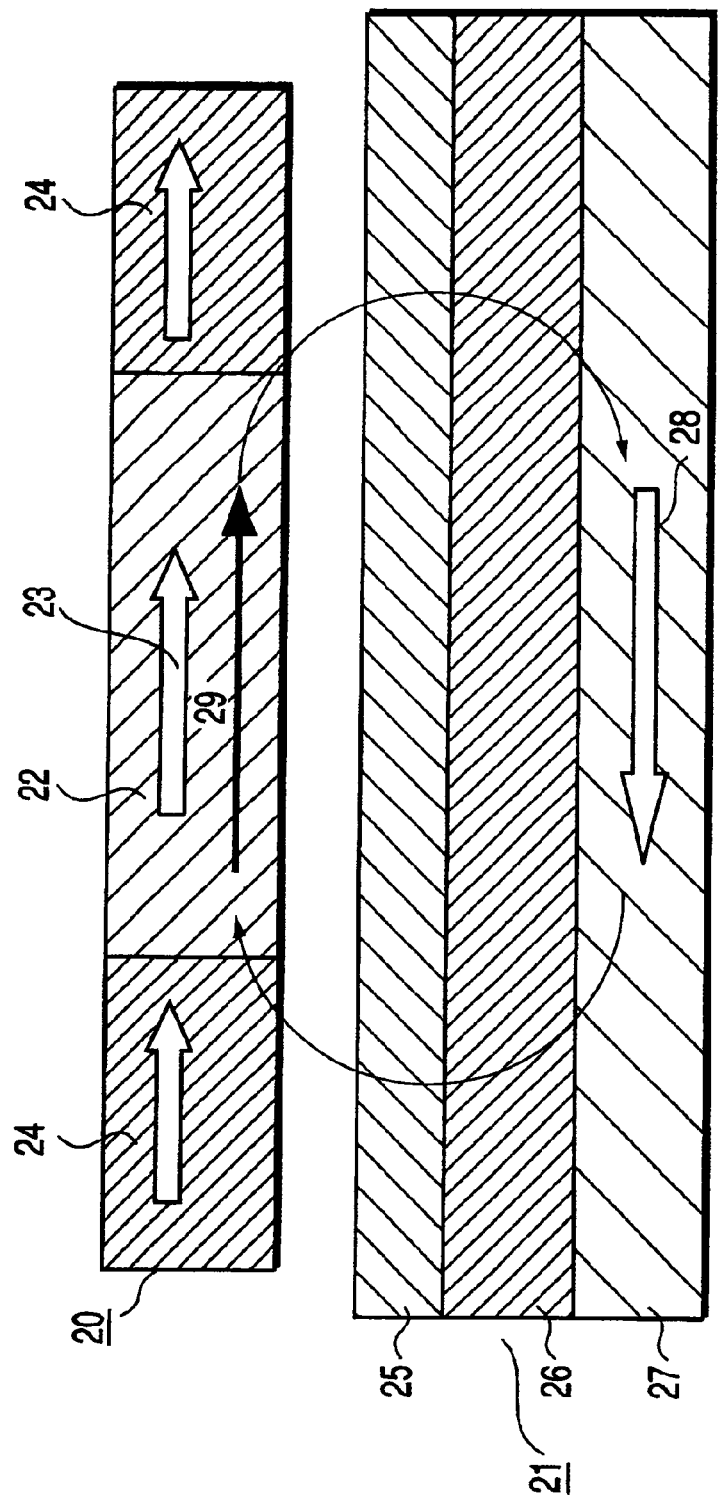
FIG. 7 is a diagram for explaining the structure of the GMR element and disk according to a modification of the same embodiment.

FIG. 7 is a diagram showing the second modification of the same embodiment.

FIG. 7 is a sectional view of a GMR element 20 and a perpendicular magnetic recording type disk 21 seen in the direction of the track width. The GMR element 20 comprises a GMR magnetic sensor portion 22 and hard magnetic film 24 for applying longitudinal bias magnetic field 23 to the GMR magnetic sensor portion 22, provided on both end portions. The hard magnetic film 24 has a function for generating bias magnetic field which produces a uniform magnetization state (29) parallel to the disk surface in the free layer of the GMR magnetic sensor portion 22.

The disk 21 includes a recording magnetic layer 25 having perpendicular anisotropy, soft magnetic layer 26 provided under this layer as a backing layer and hard magnetic layer 27. This hard magnetic film 27 is exchange-coupled with an interface of the soft magnetic layer 26 in order to suppress generation of a magnetic wall by the soft magnetic layer 26. Magnetization 28 of the hard magnetic film 27 is produced uniformly in the direction of the track width.

Magnetic field 29 is generated inside the GMR magnetic sensor portion 22 due to magnetization 28 of the hard magnetic film 27 of the disk 21 and magnetization (not shown) of the soft magnetic layer 26 oriented in the same direction by the exchange-coupling with the magnetization 28.

For the GMR magnetic sensor portion 22 to operate without saturation while receiving a strong reproduction magnetic field from the recording magnetic layer 25 of the disk 21, it is effective if the magnetic field 29 from the hard magnetic film 27 of the disk 21 is set in the same direction as the longitudinal bias magnetic field 23 generated by the hard magnetic film 24 of the GMR element 20. If the magnetic field 29 is set in an opposite direction, it acts to weaken the effect of the longitudinal bias magnetic field so that the operation of the GMR element 20 becomes very instable.

With such a structure, even if a strong reproduction magnetic field is applied from the disk 21 to the GMR element 20, the GMR magnetic sensor portion 22 can generate the magnetic field 29 in the same direction as the longitudinal bias magnetic field generated from the hard magnetic film 24 and therefore, it operates without generating the saturation phenomenon. Therefore, if the GMR element 20 of the same modification is used as a read head in the perpendicular magnetic recording type disk drive employing the double-layered perpendicular magnetic disk 21, a high quality reproduction signal without any saturation phenomenon can be obtained. As a result, it is possible to realize a disk drive in which the perpendicular magnetic recording system effective for intensified recording density and a read head element using the GMR element adapted to the perpendicular magnetic recording system are combined.

In other words, the saturation magnetic field Hs on the GMR element for use as the read head element is set larger than an average magnetic field Hmu applied from a disk magnetized uniformly to any one of positive and negative polarities to the GMR element.

Further, the maximum value Hopmax of the linear response magnetic field on the GMR element is set larger than the average magnetic field Hmu applied from a disk magnetized uniformly to any one of positive and negative polarities to the GMR element.

Further, in order to prevent a local magnetization inversion of the GMR element, the artificial antiferromagnetic coupling magnetic field Hex of the GMR element is set larger than the maximum magnetic field Hmax applied from a disk magnetized uniformly to any one of the positive and negative polarities to the GMR element.

According to the present invention, even if there is an influence of the leaking magnetic field or reproduction magnetic field from the double-layered perpendicular magnetic recording type disk medium, a high-quality read signal in which distortion of signal waveform is suppressed can be obtained from the read head element. Therefore, the perpendicular magnetic recording type disk drive, which employs the magnetic head composed of the GMR element as its read head element and the double-layered perpendicular magnetic recording type disk medium, can provide a high-quality drive performance.

What is claimed is:

1. A perpendicular magnetic recording type disk drive comprising:

a double-layered perpendicular magnetic type disk medium having a recording magnetic layer of perpendicular magnetic anisotropy and a soft magnetic layer; and a magnetic head containing a read head element configured to read data from the disk medium, wherein the read head element is a spin-valve type giant magnetoresistive (GMR) element having a hard magnetic field film for longitudinal bias and has a characteristic that a ratio between a product Mst of magnetization and film thickness of a free layer and a product Mrt of remnant magnetization and film thickness of the hard magnetic film (Mrt/Mst) is set to 3 or more, such that, in response to a magnetic field from the disk medium, the GMR outputs a signal waveform substantially without distortion.

2. The disk drive according to claim 1, wherein the read bead element is configured to have a linear magnetic field response in which an output voltage as proportional to an input magnetic field strength and linearity of the magnetic field response is secured.

3. The disk drive according to claim 1, wherein
   the read head element is configured to have a maximum magnetic field value (Hs) at which the output voltage starts saturating with increased input magnetic field strength,
   the read head element is configured to have an average magnetic field (Hmu) from the disk medium magnetized uniformly to any one of positive and negative polarities, and
   Hs is greater than Hmu.

4. The disk drive according to claim 1, wherein
   the read head element is configured to have a maximum magnetic field value (Hopmax) at which an output voltage starts departing from the linear magnetic field response,
   the read head element is configured to have an average magnetic field (Hmu) from the disk medium magnetized uniformly to any one of the positive and negative polarities, and
   Hopmax is greater than Hmu.

5. The disk drive according to claim 1, wherein
   the read head element is configured to have a maximum magnetic field (Hmax) from the disk medium magnetized uniformly to any one of the positive and negative polarities,
   the read head element is configured to have an artificialm antiferromagnetic coupling magnetic field (Hex), and
   Hex is greater than Hmax.

6. The disk drive according to claim 1, wherein
   the read head element is configured to have an artificial antiferromagnetic coupling magnetic field Hex,
   the read head element is configured to have a shield gap length Gs,
   the disk drive if configured to have a distance from the read head element to the surface of the recording magnetic layer dmag, and
   the recording magnetic layer of the disk medium is configured to have remnant magnetization Mr,
   Hex is greater than $8Mr*\arctan[Gs/(2\,dmag)]$.

7. The disk drive according to claim 1, wherein
   the disk medium further includes a bias magnetic field applying layer that is configured to fix a magnetization direction of the soft magnetic layer, and
   the read head element further includes a hard magnetic film configured to generate a longitudinal bias magnetic field, a direction of the longitudinal bias for determining an operating point of the read head element being in the same direction as a magnetic field received from the bias magnetic field applying layer.

* * * * *